United States Patent [19]

Oonuma et al.

[11] Patent Number: 5,222,470
[45] Date of Patent: Jun. 29, 1993

[54] IGNITION TIMING CONTROLLING SYSTEM FOR ENGINE

[75] Inventors: Mitsuhiko Oonuma; Sakae Saito; Hitoshi Kamura, all of Kyoto, Japan

[73] Assignee: Mitsubishi Jidosha Kogyo Kabushiki Kaisha, Japan

[21] Appl. No.: 875,089

[22] PCT Filed: Aug. 28, 1991

[86] PCT No.: PCT/JP91/01141
§ 371 Date: Apr. 28, 1992
§ 102(e) Date: Apr. 28, 1992

[87] PCT Pub. No.: WO92/04541
PCT Pub. Date: Mar. 19, 1992

[30] Foreign Application Priority Data

Aug. 31, 1990 [JP] Japan .................................. 231573

[51] Int. Cl.⁵ ................................................ F02P 5/15
[52] U.S. Cl. .................... 123/339; 123/418; 123/421
[58] Field of Search ............... 123/339, 418, 421, 422, 123/425, 488

[56] References Cited

U.S. PATENT DOCUMENTS

| | | | |
|---|---|---|---|
| 4,112,879 | 9/1978 | Assenheimer et al. | 123/488 X |
| 4,485,625 | 12/1984 | Fujimoto et al. | 123/571 X |
| 4,658,787 | 4/1987 | Takizawa | 123/422 X |
| 4,658,789 | 4/1987 | Morita | 123/422 |
| 4,915,076 | 4/1990 | Takizawa | 123/422 X |
| 4,947,816 | 8/1990 | Nakaniwa et al. | 123/422 |
| 4,986,243 | 1/1991 | Weissler, II et al. | 123/422 X |
| 5,070,840 | 12/1991 | Kanno et al. | 123/418 |

FOREIGN PATENT DOCUMENTS

| | | |
|---|---|---|
| 58-176470 | 10/1983 | Japan . |
| 61-023868 | 2/1986 | Japan . |
| 63-198748 | 8/1988 | Japan . |
| 63-289263 | 11/1988 | Japan . |
| 64-024168 | 1/1989 | Japan . |
| 64-046476 | 3/1989 | Japan . |
| 64-063654 | 3/1989 | Japan . |

*Primary Examiner*—Tony M. Argenbright
*Attorney, Agent, or Firm*—Wegner, Cantor, Mueller & Player

[57] ABSTRACT

An ignition timing control system for an internal combustion engine of the spark ignition type such as a gasoline engine. A throttle opening of the engine is sampled and a throttle opening variation is calculated. A real volumetric efficiency is calculated based on a real intake air amount and a real engine rotational speed by a real volumetric efficiency calculating device and the real volumetric efficiency is corrected based on the throttle opening variation by a volumetric efficiency correcting device to calculate an effective volumetric efficiency. An ignition timing is set in accordance with the effective volumetric efficiency and the engine rotational speed by an ignition timing setting device and an ignition timing controlling signal is developed based on the ignition timing set by the ignition timing setting device. An igniting device operates upon reception of the ignition timing controlling signal. When the real volumetric efficiency exceeds, particularly upon acceleration of the engine, a predetermined threshold value corresponding to a throttle opening around the full open value, the sampling operation is inhibited. Knocking upon acceleration can thus be prevented with certainty while preventing interference with quick acceleration of the engine.

18 Claims, 12 Drawing Sheets

FIG.1

FIG.6(a) THROTTLE OPENING θ
FIG.6(b) Evr (%)
FIG.6(c) Δθ
FIG.6(d) Evm (%)
FIG.6(e) RETARD CORRECTION AMOUNT (deg)
FIG.6(f) STROKE
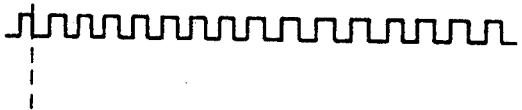

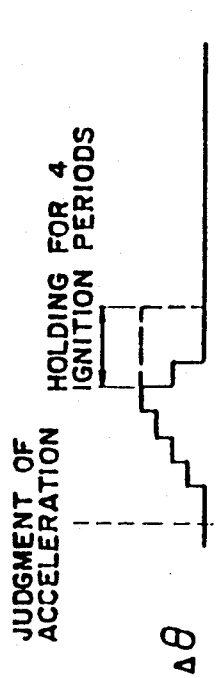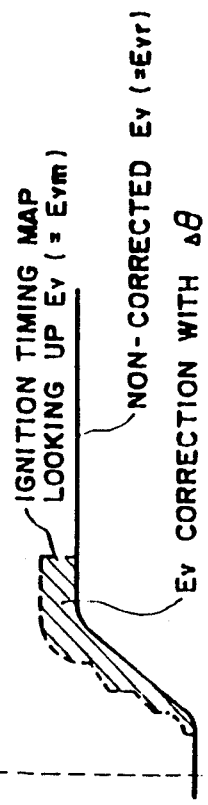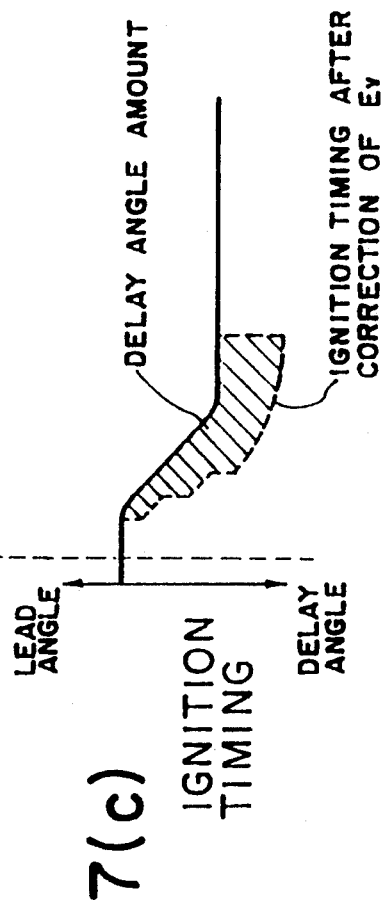

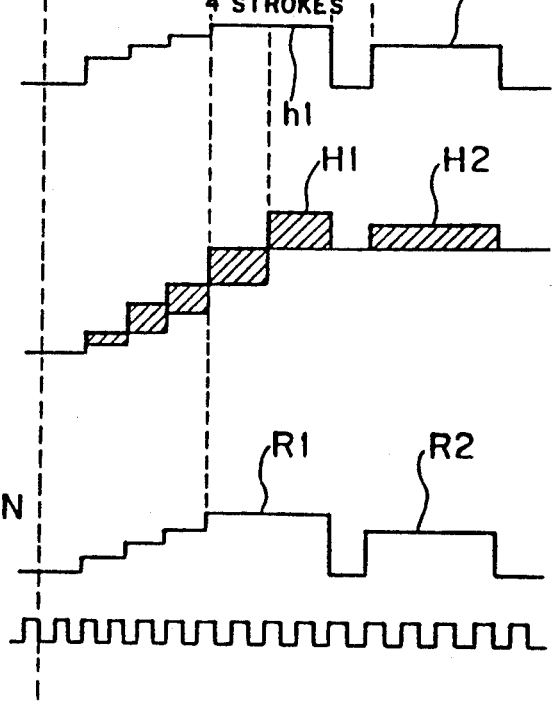

IGNITION TIMING CONTROLLING SYSTEM FOR ENGINE

FIELD OF THE INVENTION

This invention relates to an ignition timing controlling system for an engine (internal combustion engine) of the spark ignition type such as a gasoline engine, and more particularly to an ignition timing controlling system including means for preventing transition knocking of an engine upon acceleration.

BACKGROUND OF THE INVENTION

Ignition timing control of a gasoline engine is conventionally performed, for example, in the following manner.

In particular, operating conditions of an engine are detected from a flow rate sensor for detecting an amount of intake air of the engine and an engine rotational speed sensor for detecting a rotational speed of the engine, and basic ignition timing information is determined, based on results of such detection from the sensors, from a two-dimensional map (ignition timing map) having lead angle values (ignition timing information) which depend upon an engine rotational speed Ne and a volumetric efficiency Ev (real volumetric efficiency Evr) obtained as a value A/N by dividing an intake air amount A by the engine rotational speed Ne, and then suitable correction is performed for such basic ignition timing information. Then, ignition means (ignition plugs, an ignition coil and so forth) is operated in accordance with the thus obtained ignition timing information to control the ignition timing of the engine.

By the way, since sampling of an intake air amount A of an engine generally delays upon acceleration of the engine, if an ignition timing is looked up from an ignition timing map in accordance with a real volumetric efficiency Ev (hereinafter referred to sometimes as Evr) based on the thus sampled intake air amount A, then an ignition timing on the partial side (lower intake air amount side) with respect to an ignition timing based on a real intake air amount will be looked up, and consequently, the thus looked up ignition timing exhibits a little lead, which will cause transient knocking.

Thus, in order to prevent such transient knocking, it is a possible solution to correct a volumetric efficiency (ignition timing map looking up volumetric efficiency) Ev (hereinafter referred to sometimes as Evm) for looking up an ignition timing from an ignition timing map so that it may have a value free from a delay thereby to indirectly retard the ignition timing.

For example, taking notice of a variation (deviation) $\Delta\theta$ of a throttle opening as an index to an accelerating condition, the ignition timing map looking up volumetric efficiency Evm can be corrected in accordance with such throttle opening variation (throttle opening deviation) $\Delta\theta$.

Curves (a) to (c) of FIG. 7 illustrate correction of such ignition timing map looking up volumetric efficiency Evm, and the curve (a) shows a throttle opening variation $\Delta\theta$ upon acceleration of the engine; the curve (b) shows an ignition timing map looking up volumetric efficiency Evm corresponding to such throttle opening variation $\Delta\theta$; and the curve (c) shows a controlling condition of the ignition timing corresponding to such ignition timing map looking up volumetric efficiency Evm.

It is to be noted that the following description will proceed by way of an example of a four-cylinder engine.

When the throttle opening variation $\Delta\theta$ increases after a point of time at which acceleration is judged as seen from the curve (a) of FIG. 7, the volumetric efficiency Evr will be corrected so that it may increase by such an amount as represented by a hatched portion of the curve (b) of FIG. 7 in response to a magnitude of the throttle opening variation $\Delta\theta$.

Such correction is performed in accordance with the following expression (1):

$$Evm = Evr + (\Delta\theta \times G_{TH}/4) \times K_{EVNE} \tag{1}$$

where $G_{TH}$ is an ignition timing acceleration correction gain, and $K_{EUNE}$ is an ignition timing acceleration correction rotational speed coefficient.

It is to be noted that the ignition timing acceleration correction rotational speed coefficient $K_{EUNE}$ varies in such a manner as shown in FIG. 9 in response to an engine rotational speed Ne.

However, when the throttle opening variation $\Delta\theta$ assumes its peak value, the peak value is held as a sampled value of the throttle opening variation $\Delta\theta$ only for four strokes (for a period of four ignition timings) after then. Accordingly, for such period, also a corrected volumetric efficiency Evm is held at a value corresponding to such peak value.

The reason why a sampled value of the throttle opening variation $\Delta\theta$ is held in this manner is that it is intended to compensate for an overshoot of a volumetric efficiency immediately after the throttle opening is put into a fully open condition.

Meanwhile, the ignition timing map looking up volumetric efficiency Evm and the ignition timing have, when the engine rotational speed Ne is constant, such a relationship as illustrated in FIG. 8, and generally, upon acceleration of the engine, the volumetric efficiency increases and the ignition timing presents a value on the delay side. Here, if the real volumetric efficiency Evr is corrected in accordance with the throttle opening variation $\Delta\theta$ as seen from the curve (b) of FIG. 7 taking a delay of sampling of the real volumetric efficiency Evr into consideration, then the corrected ignition timing map looking up volumetric efficiency Evm is increased by such an amount as indicated by the hatched line portions comparing with the ignition timing map looking up volumetric efficiency Evm for which such correction has not been performed.

As a result, the ignition timing will be such as indicated by a broken line on the curve (c) of FIG. 7 and thus corrected to the delay side by such an amount as indicated by a hatched portion. Consequently, possible transition knocking is prevented.

By the way, if such correction of an ignition timing map looking up volumetric efficiency for determining a basic ignition timing as described above is performed, then a retard may possibly take place in the case of a specific acceleration pattern (in short, a specific throttle opening pattern) to cause incomplete acceleration.

For example, FIG. 10 is a time chart illustrating a correcting situation of a volumetric efficiency in the case of such specific acceleration pattern; and the curve (a) of FIG. 10 shows a throttle opening $\theta$ upon acceleration; the curve (b) shows a corresponding real volumetric efficiency (real Ev) Evr; the curve (c) shows a sampled value of a corresponding throttle opening variation $\Delta\theta$; the curve (d) shows a corresponding ignition timing map looking up volumetric efficiency Evm; the curve (e) shows a corresponding ignition timing controlling condition (retard correction amount); and the curve (f) shows a stroke of the engine.

In case the throttle opening $\theta$ varies in such a manner as shown by the curve (a) of FIG. 10, the throttle opening variation $\Delta\theta$ will have two peak values h1 and h2 with such a small time difference as seen from the curve (c) of FIG. 10. And, it is assumed here that, when the throttle opening $\theta$ assumes the first peak value, the real volumetric efficiency (real Ev) Evr is in a saturated condition, and consequently, even if the throttle opening $\theta$ varies after then, the real volumetric efficiency Evr will not vary in value.

Meanwhile, the sampled value of the throttle opening variation $\Delta\theta$ is held at a point of time when the throttle opening $\theta$ increases until it assumes the first peak value h1 as indicated at P1 (refer to the curve (c) of FIG. 10), and a value of a correction amount for a volumetric efficiency (refer to a hatched portion of the curve (d) of FIG. 10) then is held correspondingly. Then, the correction amount is, for example, added to the real volumetric efficiency Evr to determine an ignition timing map looking up volumetric efficiency Evm (refer to a hatched portion denoted by H1 of the curve (d) of FIG. 10). After such first time holding of a sampled value of the throttle opening variation $\Delta\theta$, when a similar change takes place again by which the throttle opening $\theta$ is increased as denoted at P2, the sampled value of the throttle opening variation $\Delta\theta$ which has been returned once to zero is held at a value of a suitable magnitude (refer to another portion h2 of the curve (c) of FIG. 10), and also a value of the volumetric efficiency correction value is held again (refer to another hatched portion H2 of the curve (d) of FIG. 10).

As a result, as seen from the curve (e) of FIG. 10, retard correction (refer to a reference character R2) will be repeated unnecessarily after transition knocking upon acceleration has been prevented (refer to another reference character R1). Accordingly, there is a problem that the output power of the engine is decreased by an amount corresponding to such retard amount and aimed acceleration of the engine will take place late as much.

The present invention contemplates solution to such problem as described above, and it is an object of the present invention to provide an ignition timing controlling system for an engine which can prevent knocking upon acceleration with certainty while minimizing a bad influence upon quick acceleration of the engine.

DISCLOSURE OF THE INVENTION

An ignition timing controlling system for an engine is characterized in that it comprises throttle opening variation sampling means for sampling a throttle opening of the engine and calculating a throttle opening variation based on a value obtained by such sampling, volumetric efficiency calculating means for calculating an effective volumetric efficiency, the volumetric efficiency calculating means including real volumetric efficiency calculating means 81 for calculating a real volumetric efficiency based on a real intake air amount and a real engine rotational speed, the volumetric efficiency calculating means further including volumetric efficiency correcting means for correcting the real volumetric efficiency based on information regarding the throttle opening variation, ignition timing setting means for setting an ignition timing in accordance with the effective volumetric efficiency and engine rotational speed, controlling means for developing an ignition timing controlling signal based on the ignition timing set by the ignition timing setting means, ignition means operable in response to reception of the ignition timing controlling signal, and sampling inhibiting means for inhibiting, when the real volumetric efficiency (Evr) exceeds, upon acceleration of the engine, a predetermined threshold value corresponding to a value of the throttle opening in the proximity of the full open value, a sampling operation of the throttle opening variation sampling means.

Preferably, the ignition timing controlling system for an engine is constructed such that the throttle opening variation sampling means updates and stores the throttle opening variation for each predetermined period, and the volumetric efficiency correcting means uses, as the information regarding the throttle opening variation, a stored value of the throttle opening variation.

In this instance, it is further preferable to construct it such that the throttle opening variation sampling means holds, for a predetermined period of time, the stored value stored at a point of time when sampling thereof is inhibited by the sampling inhibiting means.

More preferably, it is constructed such that the throttle opening variation sampling means holds, when a period for which the stored value presents no change in state continues equal to or longer than a predetermined stored value holding period after an increasing tendency of the stored value has come to an end, the stored value for the predetermined stored value holding period, but holds the stored value, when such period for which the stored value presents no change in state continues shorter than the predetermined stored value holding period, for the elapsed time then.

Further preferably, the predetermined period of time for the holding of a stored value after a point of time when sampling is inhibited is set equal to the predetermined stored value holding period.

Further preferably, it is constructed such that the throttle opening variation sampling means clears the stored information thereof after lapse of the predetermined stored value holding period.

Further preferably, the threshold value of the sampling inhibiting means is set substantially equal to 95% of a volumetric efficiency corresponding to the full open value of the throttle opening.

Meanwhile, it is also preferable to construct the ignition timing controlling system for an engine such that the throttle opening variation sampling means updates and stores the throttle opening variation for each predetermined period, and the volumetric efficiency correcting means uses, as the information regarding the throttle opening variation, a stored value of the throttle opening variation, and that the throttle opening variation sampling means clears the stored value at a point of time when sampling is inhibited by the sampling inhibiting means.

In this instance, preferably it is constructed such that the throttle opening variation sampling means holds, when a period for which the stored value presents no change in state continues equal to or longer than a predetermined stored value holding period after an increasing tendency of the stored value has come to an end, the stored value for the predetermined stored value holding period, but holds the stored value, when such period for which the stored value presents no change in state continues shorter than the predetermined stored value holding period, for the elapsed time then.

More preferably, it is constructed such that the throttle opening variation sampling means clears the stored information thereof after lapse of the predetermined stored value holding period.

Further preferably, the threshold value of the sampling inhibiting means is set substantially equal to 95% of a volumetric efficiency corresponding to the full open value of the throttle opening.

Further, it is also preferable to construct the ignition timing controlling system for an engine such that the throttle opening variation sampling means updates and stores the throttle opening variation for each predetermined period, and the volumetric efficiency correcting means uses, as the information regarding the throttle opening variation, a stored value of the throttle opening variation, and that the ignition timing is controlled in response to a temperature of cooling water for the engine.

In this instance, preferably it is constructed such that the ignition timing is set such that, the higher the temperature of cooling water, the smaller the set lead angle value thereof.

Further, it is also preferable to construct the ignition timing controlling system for an engine such that the throttle opening variation sampling means updates and stores the throttle opening variation for each predetermined period, and the volumetric efficiency correcting means uses, as the information regarding the throttle opening variation, a stored value of the throttle opening variation, and that the ignition timing is controlled in response to a temperature of intake air of the engine.

In this instance, preferably the ignition timing is set such that it is retarded in regions wherein the temperature of intake air is high and low, but it is neither advanced nor retarded in any other region.

Further, it is also preferable to construct the ignition timing controlling system for an engine such that the throttle opening variation sampling means updates and stores the throttle opening variation for each predetermined period, and the volumetric efficiency correcting means uses, as the information regarding the throttle opening variation, a stored value of the throttle opening variation, and that the ignition timing is controlled, during idling of the engine, based on information regarding a rotational speed of the engine.

In this instance, preferably it is constructed such that the information regarding the rotational speed of the engine is the engine rotational speed itself, and when the engine rotational speed exceeds an aimed rotational speed which is set in response to idling information, the ignition timing is retarded, but when the engine rotational speed is lower than the aimed rotational speed, the ignition timing is advanced.

More preferably, it is constructed such that the information regarding the rotational speed of the engine is a variation of a rotational speed of the engine, and when the engine rotational speed is in an increasing tendency, the ignition timing is retarded, but when the engine rotational speed is in a decreasing tendency, the ignition timing is advanced.

And, with the ignition timing controlling system for an engine of the present invention, a throttle opening of the engine is sampled by throttle opening variation sampling means, and a throttle opening variation is calculated based on a value obtained by such sampling. In volumetric efficiency calculating means, a real volumetric efficiency is calculated based on a real intake air amount and a real engine rotational speed by real volumetric efficiency calculating means, and the real volumetric efficiency is corrected based on information regarding the throttle opening variation by volumetric efficiency correcting means to calculate an effective volumetric efficiency. An ignition timing is set in accordance with the effective volumetric efficiency and the engine rotational speed by ignition timing setting means, and an ignition timing controlling signal is developed from controlling means based on the ignition timing set by the ignition timing setting means. Igniting means operates upon reception of such ignition timing controlling signal. When the real volumetric efficiency exceeds, particularly upon acceleration of the engine, a predetermined threshold value corresponding to a throttle opening around the full open value, a sampling operation of the throttle opening variation sampling means is inhibited by sampling inhibiting means.

BRIEF DESCRIPTION OF THE DRAWINGS

FIGS. 1 to 6 show an ignition timing controlling system for an engine as an embodiment of the present invention, and FIG. 1 is a control block diagram of the same;

FIG. 2 is a constructional view of an entire engine system having the system;

FIG. 3 is a control block diagram of the engine system;

FIG. 5 is a sampling inhibition region judgement map for the determination of a volumetric efficiency region in which sampling of a throttle opening variation is prohibited;

FIGS. 6(a-f) are a time chart illustrating a throttle opening $\theta$, a real volumetric efficiency Evr, a throttle opening variation $\Delta\theta$, an ignition timing map looking up volumetric efficiency Evm, a retard correction amount of an ignition timing and a stroke of the engine upon correction of a volumetric efficiency; and FIGS. 7 to 10 show an ignition timing controlling system for an engine which has been considered in the process of invention of the present system, and FIGS. 7(a-c) are a time chart illustrating correction of an ignition timing map looking up volumetric efficiency Evm of the same;

FIG. 8 is a view illustrating a relationship between such ignition timing map looking up volumetric efficiency Evm and an ignition timing;

FIG. 9 is a graph showing a characteristic of an ignition timing acceleration correction rotational speed coefficient; and FIGS. 10(a-f) are a time chart illustrating correction in the case of an acceleration pattern by which a problem may be caused.

BEST FORMS IN EMBODYING THE INVENTION

In the following, an ignition timing controlling system for an engine as a preferred embodiment of the present invention will be described with reference to the drawings.

Figure 2:
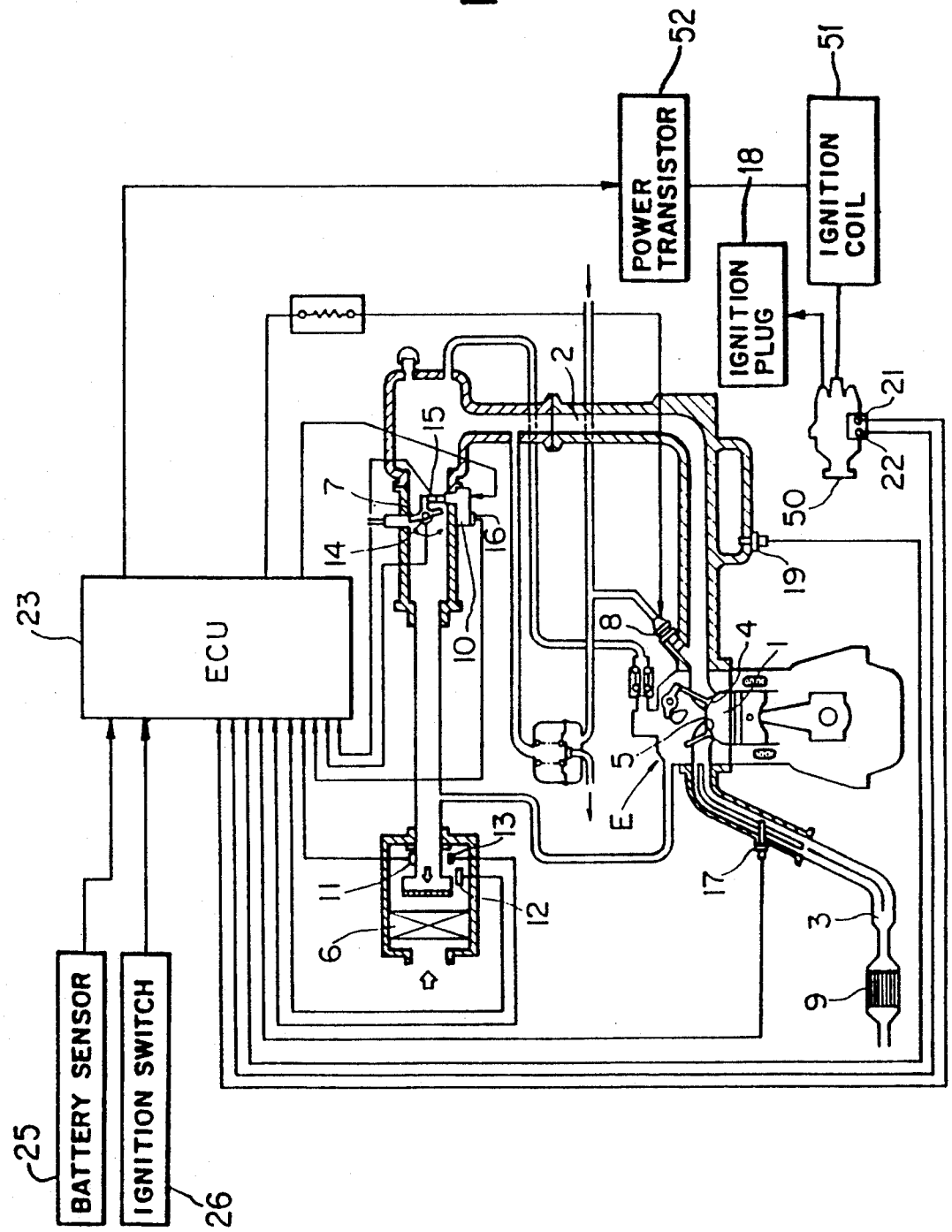

Now, the present system is provided to control a gasoline engine system carried on an automobile, and such car-carried gasoline engine system is constructed in such a manner as shown in FIG. 2.

In short, as shown in FIG. 2, the gasoline engine E (hereinafter referred to only as engine E) has an intake passageway 2 and an exhaust passageway 3 both communicated with a combustion chamber 1 thereof. The communicating condition between the intake passageway 2 and the combustion chamber 1 is controlled by an intake valve 4 while the communicating condition between the exhaust passageway 3 and the combustion chamber 1 is controlled by an exhaust valve 5.

Meanwhile, provided for the intake passageway 2 are, in an order from the upstream side, an air cleaner 6, a throttle valve 7, and an electromagnetic fuel injection valve (injector) 8 which constitutes a first engine adjusting element which has an influence on operation of the engine. Meanwhile, provided for the exhaust passageway 3 are, in an order from the upstream side, a catalytic converter (three-way catalytic converter) 9 for purification of exhaust gas and a muffler (silencer) not shown.

It is to be noted that the injector 8 is provided at the location of an intake manifold by a number equal to the number of cylinders of the engine thereby to construct a so-called multi-point injection (MPI). Accordingly, if the engine E in the present embodiment is, for example, a straight 4-cylinder engine, then it includes a total of four such injectors 8.

Meanwhile, the throttle valve 7 is connected to an accelerator pedal not shown by way of a wire cable so that the opening thereof may be varied in accordance with an amount of operation of the accelerator pedal. However, the throttle valve 7 is also connected to be driven to open or close by an idling speed controlling motor (ISC motor) 10 so that the opening of the throttle valve 7 can be varied upon idling even if the accelerator pedal is not operated.

Further, each cylinder includes an ignition plug 18 which is directed toward the corresponding combustion chamber 1 and serves as ignition means (although such ignition plug 18 must originally be depicted in the neighborhood of the combustion chamber 1 in FIG. 2, it is depicted at a different position for the convenience of illustration), and the ignition plugs 18 are connected to a distributor 50. The distributor 50 is connected to ignition coils 51. And, when a power transistor 52 connected to the ignition coil 51 operates into an off-state, a high voltage is generated at the ignition coil 51 so that either one of the four ignition plugs 18 connected to the distributor 50 makes a spark (ignites). It is to be noted that the ignition coil 51 starts its charging in response to operation of the power transistor 52 into an on-state. Thus, ignition means is constituted from the ignition plugs 18, distributor 50, ignition coil 51 and power transistor 52.

With such construction, air taken in by way of the air cleaner 6 in accordance with an opening of the throttle valve 7 is mixed with fuel from the injector 8 in the intake manifold so that a suitable air fuel ratio may be obtained, and the air fuel mixture is burnt by ignition by an ignition plug 18 at a suitable timing in a corresponding combustion chamber 1 to generate engine torque. After then, the mixture is discharged as exhaust gas into the exhaust passageway 3 and then purified by the catalytic converter 9 to remove three harmful components of CO, HC and NOx from the exhaust gas, whereafter it is silenced by the muffler and then discharged into the atmospheric air.

Further, various sensors are provided for controlling the engine E. First, provided for the intake passageway 2 are an air flow sensor 11 serving as a volumetric flow meter for detecting an intake air amount from information of Karman's vortex streets, an intake air temperature sensor 12 for detecting a temperature of intake air and an atmospheric pressure sensor 13 for detecting a pressure of the atmospheric air. Further, at a location of the intake passageway 2 where the throttle valve 7 is provided, a throttle sensor 14 of the potentiometer type for detecting an opening of the throttle valve 7, an idling switch 15 for detecting an idling condition and a motor position sensor 16 for detecting a position of the ISC motor 10 are provided.

Meanwhile, an oxygen concentration sensor ($O_2$ sensor) 17 for detecting a concentration of oxygen (concentration of $O_2$) in exhaust gas is provided at a location of the exhaust passageway 3 near the combustion chamber 1 on the upstream side of the catalytic converter 9. Here, the $O_2$ sensor adopts the principle of an oxygen concentration cell of a solid state electrolyte, and an output thereof has a characteristic that it varies suddenly in the proximity of a stoichiometric mixture ratio such that the voltage thereof is lower on the lean side but higher on the rich side than the stoichiometric mixture ratio.

Further sensors are additionally provided, including a water temperature sensor 19 for detecting a temperature of engine cooling water, a crank angle sensor 21 for detecting a crank angle (since such crank angle sensor 21 serves also as an engine rotational speed sensor for detecting an engine rotational speed Ne, it will be hereinafter referred to sometimes as an engine rotational speed sensor), a TDC sensor 22 for detecting a top dead center of the first cylinder (reference cylinder) of the engine, all provided on the distributor 50.

By the way, detection signals from the sensors 11 to 17, 19, 21 and 22 are inputted to an electronic controlling unit (ECU) 23.

It is to be noted that also a voltage signal from a battery sensor 25 for detecting a voltage of a battery 24 (refer to FIG. 3) and a signal from an ignition switch (key switch) 26 are inputted to the ECU 23.

Figure 3:
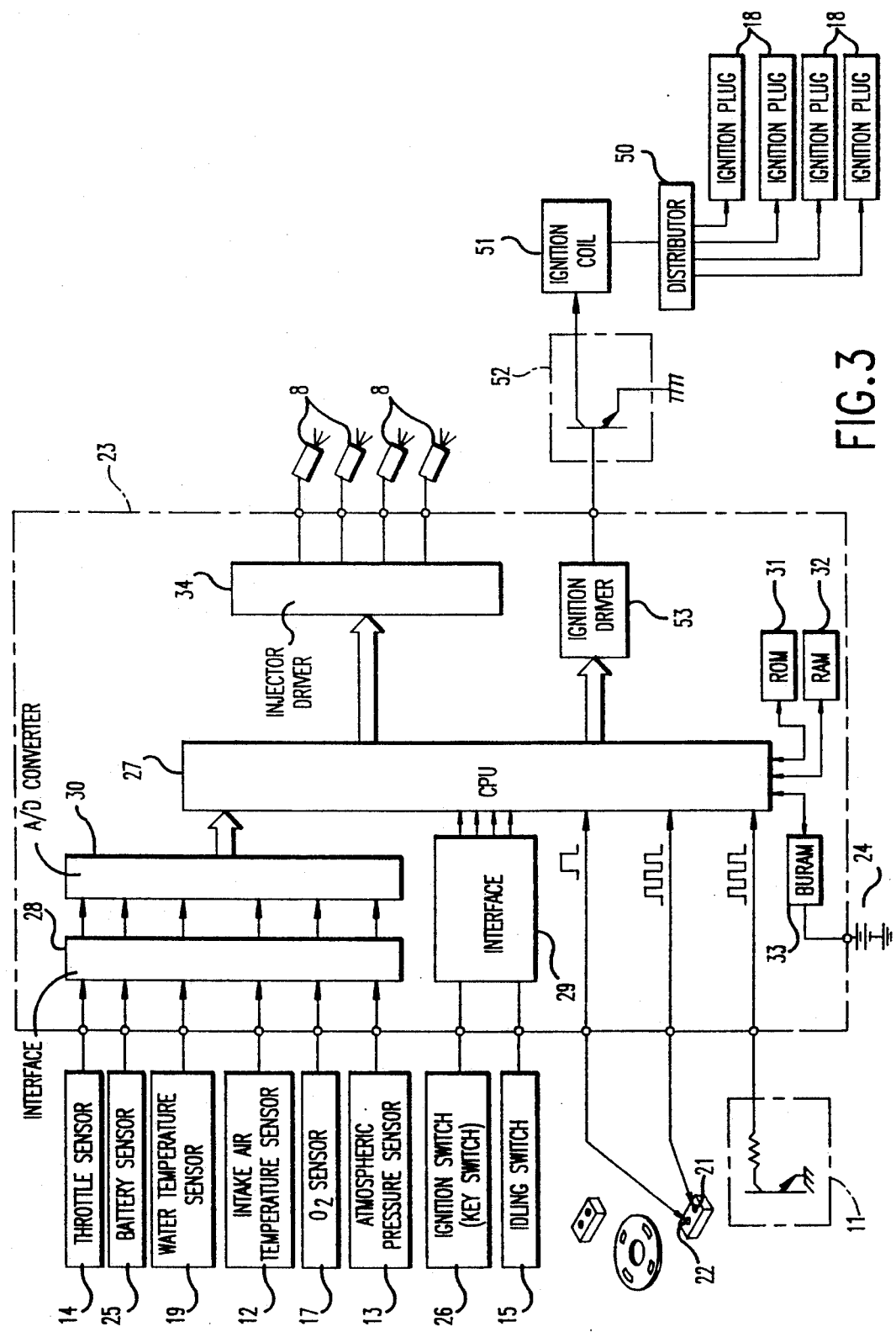

Meanwhile, hardware construction of the ECU 23 is such as shown in FIG. 3, and the ECU 23 includes a CPU 27 as a principal component. Detection signals from the intake air temperature sensor 12, atmospheric pressure sensor 13, throttle sensor 14, $O_2$ sensor 17, water temperature sensor 19 and battery sensor 25 are inputted to the CPU 27 by way of an input interface 28 and an analog to digital converter 30. Further, detection signals from the idling sensor 15 and ignition switch 26 are inputted to the CPU 27 by way of another input interface 29, and detection signals from the air flow sensor 11, crank angle sensor 21 and TDC sensor 22 are inputted directly to respective input ports of the CPU 27.

Further, the CPU 27 transfers, by way of a bus line, data from and/or to a ROM 31 in which program data and fixed value data are stored, a RAM 32 which are updated from time to time, and a battery backed up RAM (BURAM) 33 which is backed up by a battery 24 to maintain its stored contents while such battery 24 is connected thereto.

It is to be noted that data in the RAM 32 are erased to reset the RAM 32 when the ignition switch 26 is turned off.

On the other hand, an ignition timing controlling signal is outputted from the CPU 27 to the power transistor 52 by way of an ignition driver 53 and is transmitted by way of the ignition coil 51 to the distributor 50 so that, for example, the four ignition plugs 18 are successively caused to spark.

Figure 1:
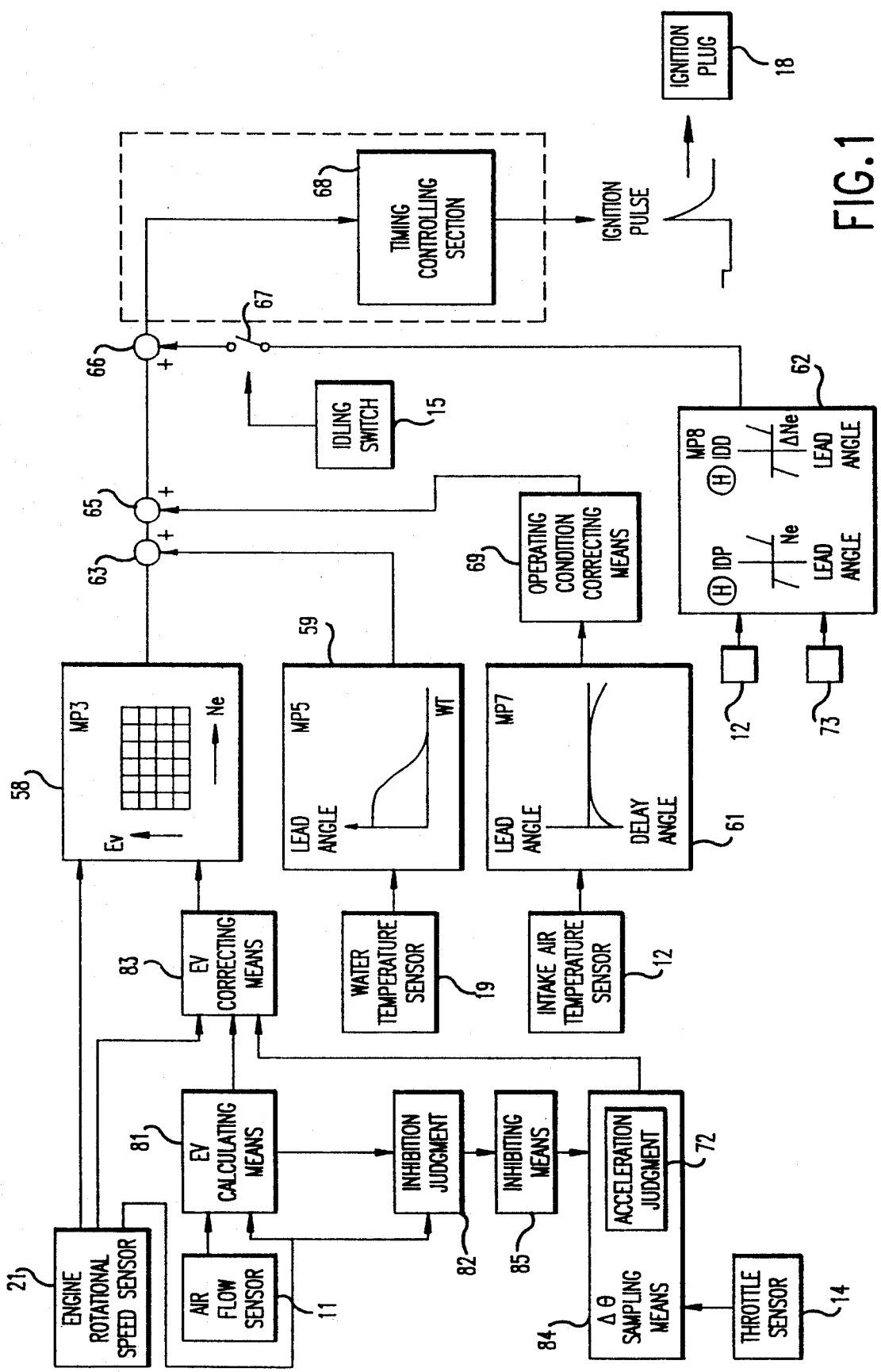

By the way, a system for such ignition timing control is shown in more detail in FIG. 1. In particular, as shown in FIG. 1, the ignition timing controlling system includes, in addition to basic ignition timing setting means (ignition timing setting means) 58 having an ignition timing map MP3 in which two-dimensional basic ignition timing data (lead angle data) $\Theta_\phi$ are stored, water temperature correcting means 59 having a water temperature correction map MP5, intake air temperature correcting means 61 having an intake air temperature correction map MP7, and idling stabilization correcting means 62 having two idling stabilization correction maps MP8. It is to be noted here that a basic ignition timing corresponds to an ignition timing as set forth in the claims.

In the basic ignition timing setting means 58, a basic ignition timing $\Theta\phi$ is determined (looked up) from map values of the ignition timing map MP3 if a ratio A/N (intake air amount/engine rotational speed) and accordingly a volumetric efficiency Ev and an engine rotational speed Ne are given.

A value of such volumetric efficiency Ev is calculated by volumetric efficiency calculating means (Ev calculating means) 80, and the volumetric efficiency calculating means 80 is constituted from real volumetric efficiency calculating means 81 and volumetric efficiency correcting means 83.

The real volumetric efficiency calculating means 81 calculates a real volumetric efficiency Evr from a real intake air amount A detected by the air flow sensor 11 and a real engine rotational speed Ne detected by the engine rotational speed sensor 21.

Meanwhile, the volumetric efficiency correcting means 83 performs correction for the prevention of possible transition knocking upon acceleration of the engine and thus effects indirect retard correction of an ignition timing by way of such volumetric efficiency correction. More particularly, if it is judged by acceleration judging means 72 that the engine is in an accelerating condition and sampled data of a throttle opening variation (increasing amount) $\Delta\theta$ of the engine are received by the volumetric efficiency correcting means 83, then the volumetric efficiency correcting means 83 corrects a volumetric efficiency Ev so that it may be increased in accordance with a magnitude of such throttle opening variation $\Delta\theta$. On the other hand, in case an accelerating condition of the engine is not judged, such correction as described above is not performed, but the volumetric efficiency correcting means 83 outputs a real volumetric efficiency Evr calculated by the real volumetric efficiency calculating means 81 as a basic ignition timing map looking up volumetric efficiency (effective volumetric efficiency) Evm which will be hereinafter described.

It is to be noted that judgment of acceleration by the acceleration judging means 72 is performed such that a throttle opening $\theta$ is fetched, for example, for each 10 msec (0.01 second), and if a throttle opening variation $\Delta\theta$ ($=\theta-M\theta$) calculated from the current opening $\theta$ and another opening $M\theta$ of a preceding cycle stored in a memory is in the positive, then it is judged that the engine is in an accelerating condition. Further, while such throttle opening variation $\Delta\theta$ is stored as $M\Delta\theta$ into the memory, it is also possible to effect judgment of acceleration based on the stored value $M\Delta\theta$.

By the way, such volumetric efficiency correction as described above proceeds in such a manner as shown by the time chart of FIG. 7 described hereinabove except when sampling of the throttle opening variation $M\Delta\theta$ is inhibited.

In short, volumetric efficiency correction is performed in accordance with each sampled throttle opening variation $\Delta\theta$ only while the throttle opening variation $\Delta\theta$ increases after starting of acceleration relative to the real volumetric efficiency Evr (only until the throttle opening variation $\Delta\theta$ reaches its peak), and after the throttle opening variation $\Delta\theta$ reaches its peak, such peak value $\Delta\theta_P$ is held for a predetermined period of time and volumetric efficiency correction is performed in response to the thus held peak value $\Delta\theta_P$. Here, such holding is performed only while ignition takes place once with each of the cylinders. For example, in the case of a four cylinder engine, the peak value $\Delta\theta_P$ is held for a period of four strokes (four ignitions).

Judgment whether or not the throttle opening variation $\Delta\theta$ is at its peak is performed such that, for example, a difference ($\Delta\theta-M\Delta\theta$) between a current throttle opening variation $\Delta\theta$ and a stored value $M\Delta\theta$ of such throttle opening variation is calculated, and when the difference changes from a positive value to a negative value, it is judged that the stored value $M\Delta\theta$ of the throttle valve variation of the preceding cycle has been a peak value.

A throttle opening variation $\Delta\theta$ is calculated by throttle opening variation sampling means 84 from detection information from the throttle sensor 14 and outputted as data.

Sampling inhibiting means (denoted as inhibiting means in FIG. 1) 85 is provided for the throttle opening variation sampling means 84.

Figure 5:
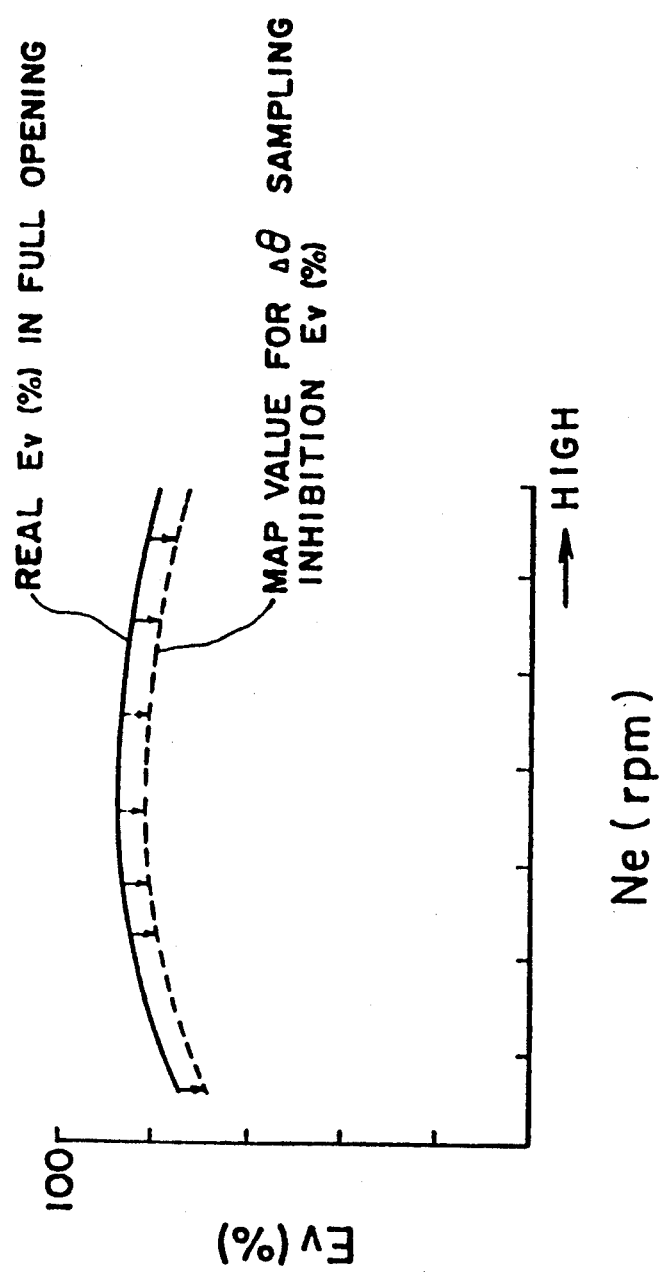
Figure 8:
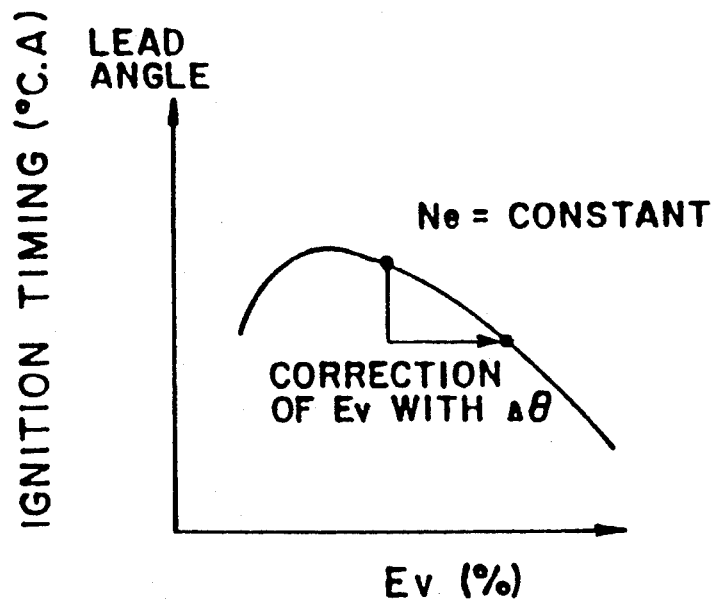

The sampling inhibiting means 85 outputs a sampling inhibiting signal for the inhibition of sampling of a throttle opening variation at a predetermined stage around a full open value of the throttle opening before the real volumetric efficiency Evr reaches a value corresponding to such full open value of the throttle opening. Here, a region in which the real volumetric efficiency Evr is higher than 95% of the full open value is determined as a sampling inhibition region. Thus, it is judged from such a sampling inhibition region judging map as shown in FIG. 5 by the inhibition region judging means (denoted as inhibition judgment in FIG. 1) whether or not the real volumetric efficiency Evr is within the sampling inhibition region (a region wherein it is higher than a sampling inhibition map value). Then, if it is judged by the inhibition region judging means 82 that the real volumetric efficiency Evr is within the sampling inhibition region, then a sampling inhibiting signal is outputted from the sampling inhibiting means 85 to the throttle opening variation sampling means 84.

When sampling is inhibited by the sampling inhibiting means 85, the throttle opening variation sampling means 84 stores a value $M\Delta\theta$ at a point of time of such inhibition of sampling and thereafter holds the stored value $M\Delta\theta$ for a predetermined period of time.

In case, for example, a condition wherein the stored value $M\Delta\theta$ remains substantially constant and does not present any change continues after it has exhibited some increase, the throttle opening variation sampling means 84 holds, if such condition wherein the stored value MΔθ is substantially constant continues for a period of time longer than a predetermined period of time, the stored value MΔθ for such predetermined period of time (for a storage value holding time). However, if the condition wherein the stored value MΔθ is substantially constant continues for a period of time shorter than the stored value holding period, the stored value MΔθ is held only for the elapsed period of time. After then, the stored value MΔθ is cleared in either case. A holding period of the stored value MΔθ from the point of time when sampling is inhibited can be made as a stored value holding period.

Accordingly, when the real volumetric efficiency Evr reaches a region in which it is higher than the full open value, data of the throttle opening variation Evr will not substantially be transmitted to the volumetric efficiency correcting means 83, and consequently, correction of a volumetric efficiency Ev is stopped at the volumetric efficiency correcting means 83.

A basic ignition timing can be looked up from the ignition timing map MP3 in accordance with a real engine rotational speed Ne detected by the engine rotational speed sensor 21 and a basic ignition timing map looking up volumetric efficiency Evm which is obtained by suitable acceleration correction of the real volumetric efficiency Evr in this manner by the volumetric efficiency correcting means 83.

The water temperature correction map MP5 stores therein a relationship between a cooling water temperature WT and a lead angle amount $\Theta_{WT}$. The relationship between them is such that the higher the cooling water temperature, the smaller the lead angle amount $\Theta_{WT}$.

The intake air temperature correction map MP7 stores therein a relationship between an intake air temperature AT and a delay or lead angle amount $\Theta_{AT}$. The relationship between them is such that the lead angle amount is increased where the intake air temperature AT is high and low, but the lead angle amount is zero where the intake air amount AT is at a medium level.

The idling stabilization correction maps MP8 are provided, for example, for proportional control (P control) and for differential control (D control), and the idling stabilization correction map MP8 for P control stores therein a relationship between an engine rotational speed Ne and ignition timing information $\Theta_{IDP}$. The relationship between them is such that, when the engine rotational speed Ne is hither than an ISC aimed engine rotational speed $Ne_\phi$ which is set by ISC (idling speed control) aimed engine rotational speed setting means 73, the ignition timing is retarded, but when the engine rotational speed Ne is lower than such ISC aimed engine rotational speed $Ne_\phi$, the ignition timing is advanced. Meanwhile, the idling stabilization correction map MP8 for D control stores therein a relationship between an engine rotational speed variation ΔNe and ignition timing information $\Theta_{IDD}$. The relationship is such that, when the engine rotational speed is in an increasing tendency, the ignition timing is retarded, but when the engine rotational speed is in a decreasing tendency, the ignition timing is retarded. It is to be noted that, in either case, an insensitive band is provided for prevention of hunting.

Basic ignition timing data $\Theta_\phi$ from the basic ignition timing setting means 58 and water temperature correction data $\Theta_{WT}$ from the water temperature correcting means 59 are added by adding means 63. Meanwhile, intake air temperature data $\Theta_{AT}$ from the intake air temperature correcting means 61 undergoes suitable correction in accordance with an operating condition of the engine by operating condition correcting means 69. Data from the operating condition correcting means 69 are added to data ($\Theta_\phi + \Theta_{WT}$) from the adding means 63 by another adding means 65.

Output data of the adding means 65 are added to idling stabilization data $\Theta_{IDP}$ and $\Theta_{IDD}$ from the idling stabilization correcting means 62 and transmitted to a timing controlling section (controlling means) 68.

It is to be noted that a switch 67 is interposed between the idling stabilization correcting means 62 and the adding means 66. The switch 67 is closed when the idling switch 15 is in an on-state upon idling of the engine, but is open in any other case.

The timing controlling section 68 determines an ignition timing from such basic ignition timing data $\Theta_\phi$ as described above into which various correction data ($\Theta_{WT}$, $\Theta_{AT}$, $\Theta_{IDP}$, $\Theta_{IDD}$) are included, and outputs an ignition timing controlling signal.

Meanwhile, a fuel injection controlling signal is outputted from the CPU 27 by way of an injector driver 34 as seen in FIG. 3 so that, for example, the four injectors 8 may be driven successively.

The engine ignition timing controlling system as an embodiment of the present invention is constructed in such a manner as described above. In the following, a process of setting an ignition timing will be described with reference to the flow charts of FIGS. 4(a) to 4(c).

Figure 4A:
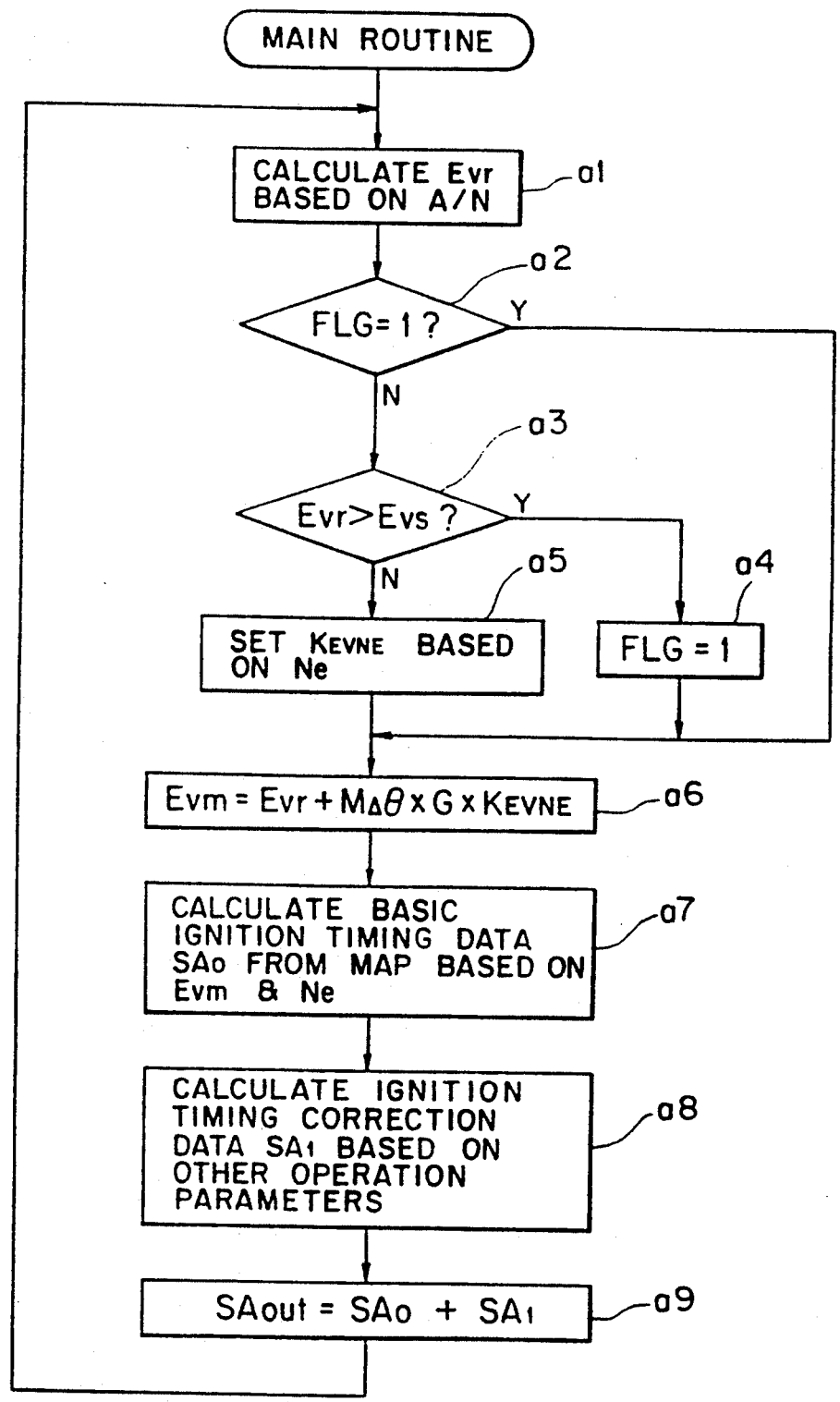
FIGS. 4(a) to 4(c) are flow charts individually illustrating contents of control by the system.
Figure 4B:
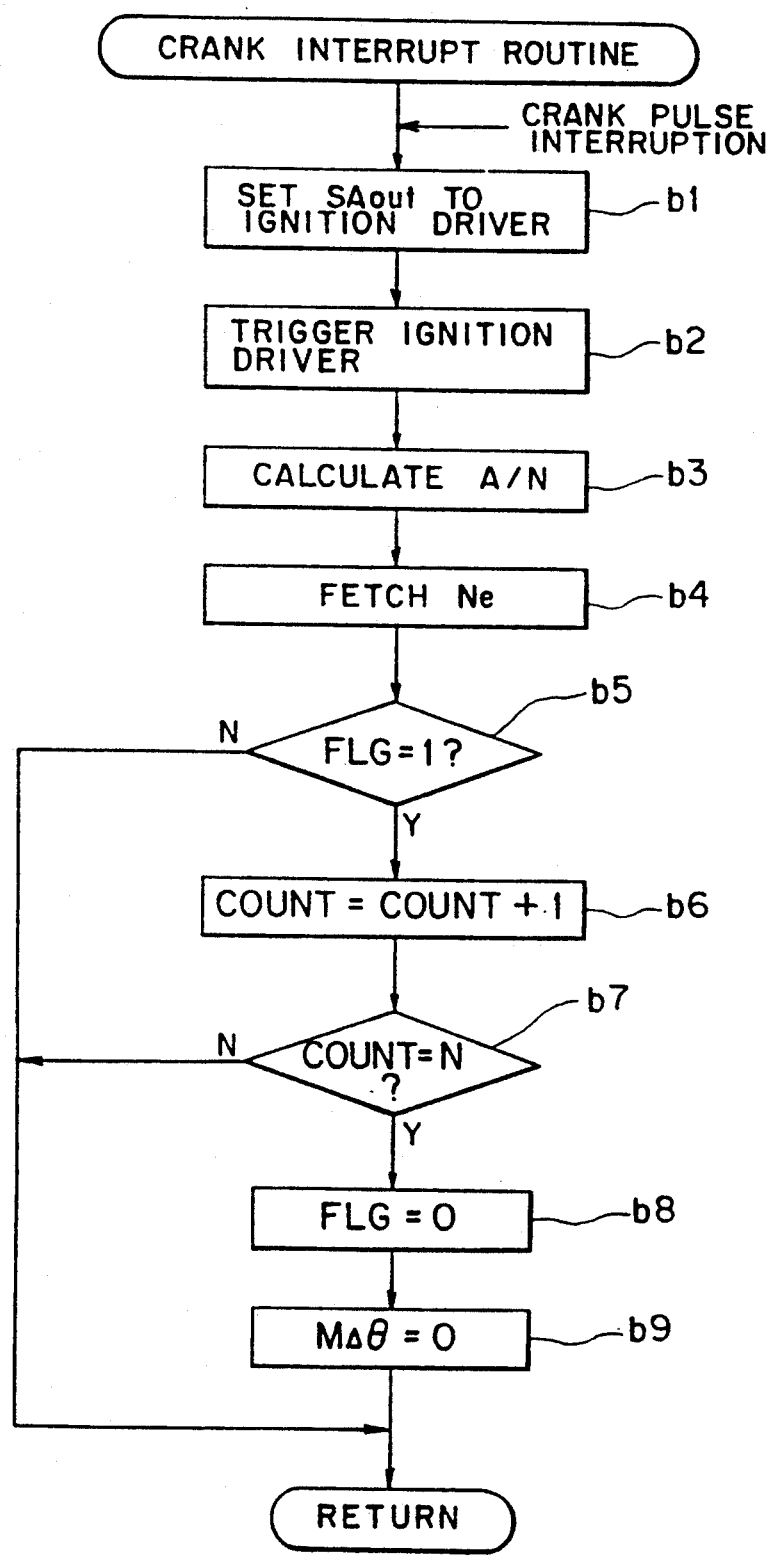
Figure 4C:
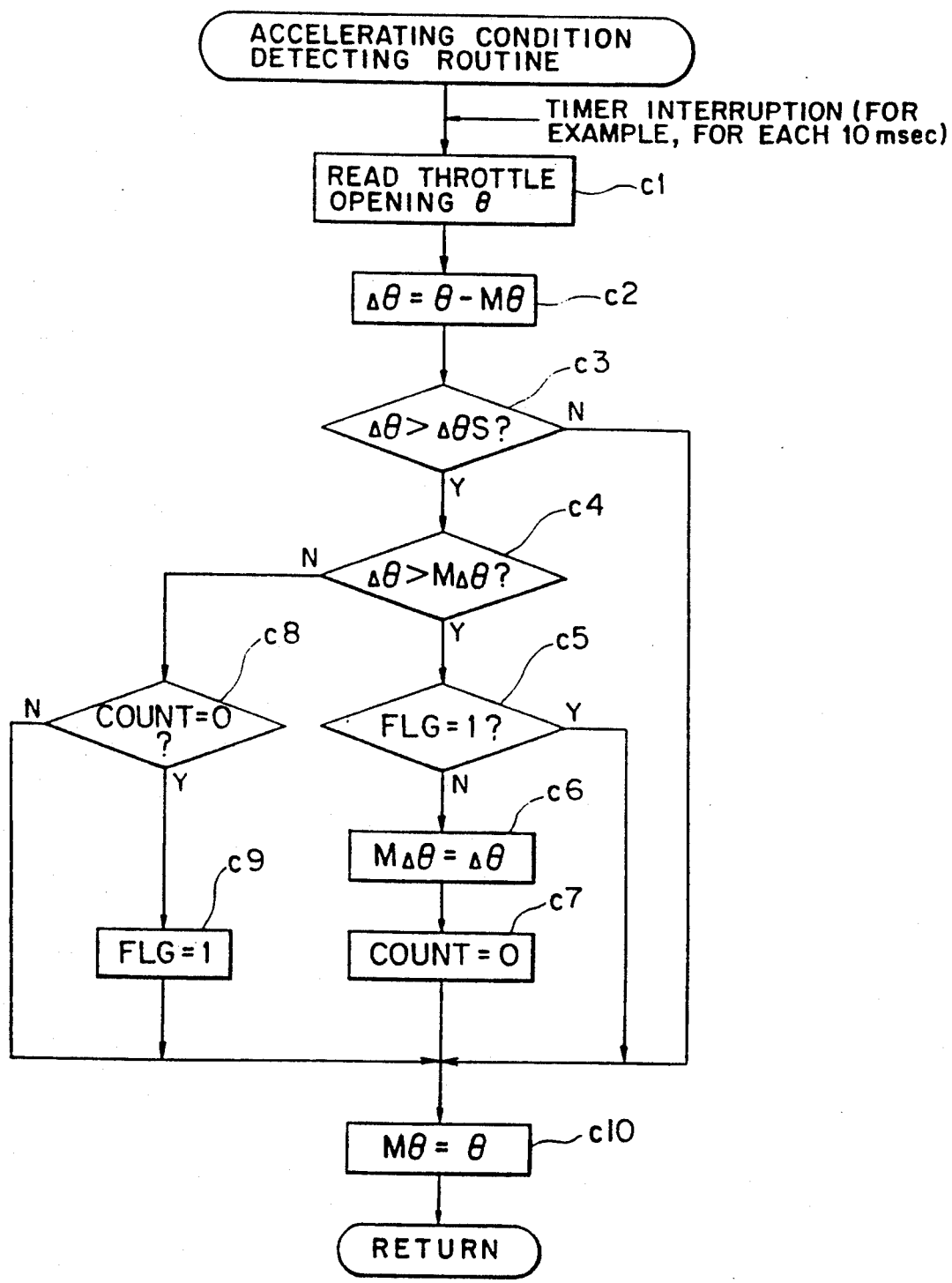

FIG. 4(a) shows a main routine for the setting of an ignition timing; FIG. 4(b) shows a crank interrupt routine which is executed for each bottom dead center of 90 degrees of the cylinders in response to a crank pulse (for each one stroke, that is, for each crank angle of 180 degrees); and FIG. 4(c) shows an accelerating condition detecting routine which is a timer interrupt routine executed by timer interruption, for example, for each 10 milliseconds.

The crank interrupt routine will be described first. Referring to FIG. 4(b), a latest set ignition timing SAout is set to the ignition driver 53 before each ignition of each cylinder (a point of time at 90 degrees from the bottom dead center) (step b1), and then the ignition driver 53 is triggered (step b2). Then, a value A/N (intake air amount/engine rotational speed) is calculated in accordance with detection information A and Ne from the air flow sensor 11 and engine rotational speed sensor 21 by the real volumetric efficiency calculating means 81 (step b3), and then the detection information (engine rotational speed) Ne from the engine rotational speed sensor 21 is fetched (step b4).

Then at step b5, it is judged where or not a flag FLG, which is set at a point of time when the throttle opening variation Δθ reaches its peak or at another point of time at which the real volumetric efficiency Evr exceeds a threshold value Evs set for judgment of inhibition of sampling, is in a set state. Then, when the judgment is YES, the control sequence advances to step b6, at which a count value COUNT is incremented, whereafter the control sequence advances to step b7. Here at step b7, it is judged whether or not the count value COUNT is equal to N (here N=5), and then if the count value COUNT is not equal to N, then the control sequence returns. But on the contrary if the count value COUNT is equal to N, then the control sequence advances to step b8. At step b8, the flag FLG is cleared, and then at next step b9, a stored value MΔθ of a throttle opening variation is cleared, whereafter the control sequence returns.

On the other hand, in case the judgment at step b5 is NO, the control sequence directly returns.

Subsequently, the accelerating condition detecting routine which is an interrupt routine to be executed, for example, for each 10 milliseconds will be described. Referring to FIG. 4(c), a throttle opening $\theta$ detected by the throttle sensor 14 is first read in (step c1), and then a throttle opening variation $\Delta\theta$ ($=\theta-M\theta$) is calculated from the throttle opening $\theta$ and another throttle opening $M\theta$ of a preceding cycle stored in the memory (step c2).

Then, it is judged at step c3 whether or not the engine is in an accelerating condition depending upon whether or not the throttle opening variation $\Delta\theta$ is higher than an acceleration insensitive band (0 to $\Delta\theta S$) near the 0 (in short, $\Delta\theta > \Delta\theta S$). If the engine is in an accelerating condition, then the control sequence advances to step c4, at which it is judged whether or not the current throttle opening variation $\Delta\theta$ is higher than a throttle opening variation $M\Delta\theta$ of a preceding cycle stored in the memory. Then, in case $\Delta\theta$ is higher than $M\Delta\theta$, it is determined that the throttle opening variation $\Delta\theta$ is increasing and is not at a peak, and the control sequence advances to step c5, at which it is judged whether or not the flag FLG is in a set state equal to 1. If the judgement is YES, then the control sequence advances to step c10, but if the judgment is NO, then the control sequence advances to step c6, at which the throttle opening variation $\Delta\theta$ of the present control cycle is stored as a stored value $M\Delta\theta$, and to step c7, at which the count value COUNT is cleared to 0, and then to step c10.

Then, the control sequence advances to step c10, at which the throttle opening $\theta$ of the present control cycle is stored as a stored value $M\theta$, whereafter the control sequence returns. It is to be noted that, in case it is judged at step c3 that the engine is not in an accelerating condition, the control sequence advances to step c10, at which the throttle opening $\theta$ of the present control cycle is stored as a stored value $M\theta$, and then returns. Meanwhile, if the throttle opening variation $\Delta\theta$ is not in an increasing condition at step c4, the control sequence advances to step c8, at which it is judged whether or not the count value COUNT is equal to 0. If the judgment here is YES, that is, if the throttle opening variation $\Delta\theta$ has been in an increasing tendency till immediately before then, then the control sequence advances to step c9, at which the flag FLG is set to 1, and further to step c10, at which the throttle opening $\theta$ of the present control cycle is stored as a stored value $M\theta$, whereafter the control sequence returns. If the judgement at step c8 is NO, the control sequence immediately advances to step c10,, at which the throttle opening $\theta$ of the present control cycle is stored as a stored value $M\theta$, and then returns.

While such subroutines as described above are executed cyclically, such main routine for the setting of a basic ignition timing as shown in FIG. 4(a) is executed. Referring to FIG. 4(a), in the routine shown, a real volumetric efficiency Evr is first set from a ratio A/N (intake air amount/engine rotational speed) by the real volume efficiency calculating means 81 (step a1), and then it is judged at step a2 whether or not the flag FLG is in a set state, that is, whether or not it is in a holding period for a throttle opening amount $\Delta\theta$. If the judgment here is YES, then the control sequence advances to step a6.

On the contrary if the judgment is NO, then the control sequence advances to step a3, at which it is judged whether or not the real volumetric efficiency Evr is higher than the sampling inhibition threshold value Evs, and if the judgment is YES, then the flag FLG is set at step a4, but on the contrary if the judgment is NO, then the control sequence advances to step a5. The judgment at step a3 can be made from the real volumetric efficiency Evr and an engine rotational speed Ne based on such sampling inhibition region judgement map as shown in FIG. 5.

Figure 9:
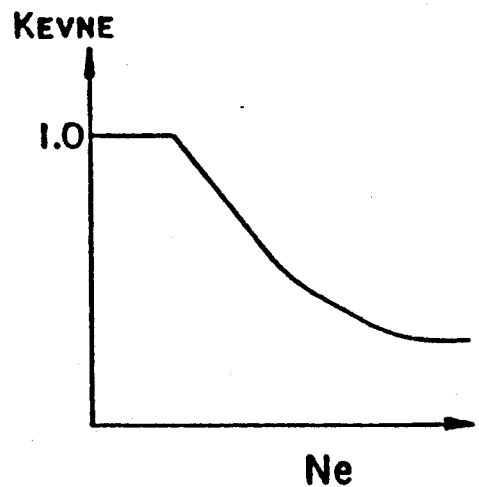

At step a5, an ignition timing acceleration correction speed coefficient $K_{EVNE}$ is set in accordance with the engine rotational speed Ne. The engine rotational speed Ne and the ignition timing acceleration correction speed coefficient $K_{EVNE}$ have such a relationship as shown in FIG. 9, and accordingly, setting of such coefficient $K_{EVNE}$ may be performed relying upon such map as shown in FIG. 9.

Subsequently, the real volumetric efficiency Evr is corrected at step a6 in accordance with the expression (1) given hereinabove, that is, $Evm = Evr + (M\Delta\theta \times G) \times K_{EVNE}$ to obtain an ignition timing map looking up volumetric efficiency Evm. In the expression above, $G = G_{TH}/4$.

Then at step a7, basic ignition timing data $SA_\phi$ are set in accordance with ignition timing map MAP3 regarding a volumetric efficiency Evm and an engine rotational speed Ne, and then at next step a8, ignition timing correction data $SA_1$ are set in accordance with other operation data (for example, $\theta_{WT}$, $\theta_{AT}$, $\theta_{IDP}$, $\theta_{IDD}$).

At subsequent step a9, an ignition timing $SAout = SA_\phi + SA_1$ is calculated from the basic ignition timing data $SA_\phi$ and ignition timing correction data $SA_1$. After then, the control sequence returns to step a1 again.

The ignition timing SAout set in this manner is used for setting of an ignition driver which is executed in the crank interrupt routine described hereinabove with reference to FIG. 4(b).

Accordingly, when the throttle opening variation $\Delta\theta$ reaches a peak upon correction during acceleration, the count value COUNT will be no more reset in the accelerated condition detecting routine, and consequently, or if the real volumetric efficiency Evr exceeds the threshold value Evs, the flag FLG is set so that counting will thereafter proceed in the crank interrupt routine. Then, during four strokes until the count value COUNT reaches 5 after the throttle opening variation $\Delta\theta$ reaches its peak or after the real volumetric efficiency Evr exceeds the threshold value Evs, that is, for a period of time while the count value COUNT assumes any value from 1 to 4, an ignition timing SAout which is set in response to an ignition timing map looking up volumetric efficiency Evm based on the throttle opening variation $\Delta\theta$ which was held when the throttle opening $\Delta\theta$ reached its peak or when the real volumetric efficiency Evr exceeded the threshold value Evs is used for setting of an ignition driver to be executed in the crank interrupt routine.

Then, after the count value COUNT changes to 5, the stored value $M\Delta\theta$ of a throttle opening variation is reset to 0 at step b9 of the crank interrupt routine.

After then, even if a peak takes place with the throttle opening variation $\Delta\theta$ again and acceleration is judged at step c4 of the accelerated condition detecting routine, the flag FLG remains in a set state and updating of the stored value $M\Delta\theta$ is not performed for a predetermined period of time when the real volumetric efficiency Evr remains within a region having a certain width around the full open value (a region wherein the real volumetric efficiency Evr is higher than 95% of the full open value). Consequently, the control sequence advances from step a2 to step a6 in the main routine in a condition wherein the stored value MΔθ is MΔθ=0, and accordingly, correction of a volumetric efficiency Ev is not performed, but a real volumetric efficiency Evr set at step a1 is adopted as an ignition timing looking up volumetric efficiency Evm.

Such a special acceleration pattern as described so far corresponds to a throttle operation illustrated in FIG. 6, in which the curves (a) to (f) correspond to the curves (a) to (f) of FIG. 10, respectively.

In short, if the throttle opening θ varies in such a manner as shown by the curve (a) of FIG. 6, then the throttle opening variation Δθ has two peak values h1 and h2 at a small time difference. Thus, it is assumed that, when the throttle opening θ assumes the first peak value, the real volumetric efficiency Evr reaches a value around its peak value, and after then, even if the throttle opening θ varies from P1 to P2, the real volumetric efficiency Evr is held at such value around the peak value.

Meanwhile, a sampled value of the throttle opening variation Δθ is held, after it assumes the first peak value h1, for four strokes of ignition (refer to the curve (c) of FIG. 6), and a correction amount for an ignition timing looking up volumetric efficiency Evm is held correspondingly (refer to a hatched portion of the curve (d) of FIG. 6). However, since, at the point of time, the real volumetric efficiency Evr enters the sampling inhibition region higher than the aforementioned threshold value Evs, sampling of the throttle opening variation Δθ is inhibited, and consequently, updating of a sampled value of the throttle opening variation Δθ will no more be performed after then.

Consequently, even if the throttle opening θ assumes the peak value P2 again after it has assumed the first peak value P1, such a condition is prevented that a sampled value of the throttle opening variation Δθ is held at a value of a suitable magnitude again (refer to a portion of the curve (c) of FIG. 6 indicated by the reference character h2). Consequently, also holding of a value of the ignition timing map looking up volumetric efficiency Evm (refer to a portion of the curve (d) of FIG. 6 indicated by the reference character H2) is prevented.

As a result, even where the acceleration pattern is such a special one as described above, after transition knocking upon acceleration is prevented (refer to a portion of the curve (e) of FIG. 6 indicated by the reference character R1), retard correction will no more be repeated unnecessarily. Thus, after transition knocking upon acceleration is prevented, output power of the engine can be increased quickly, and aimed acceleration of the engine can be performed with certainty in any acceleration pattern.

Figure 4D:
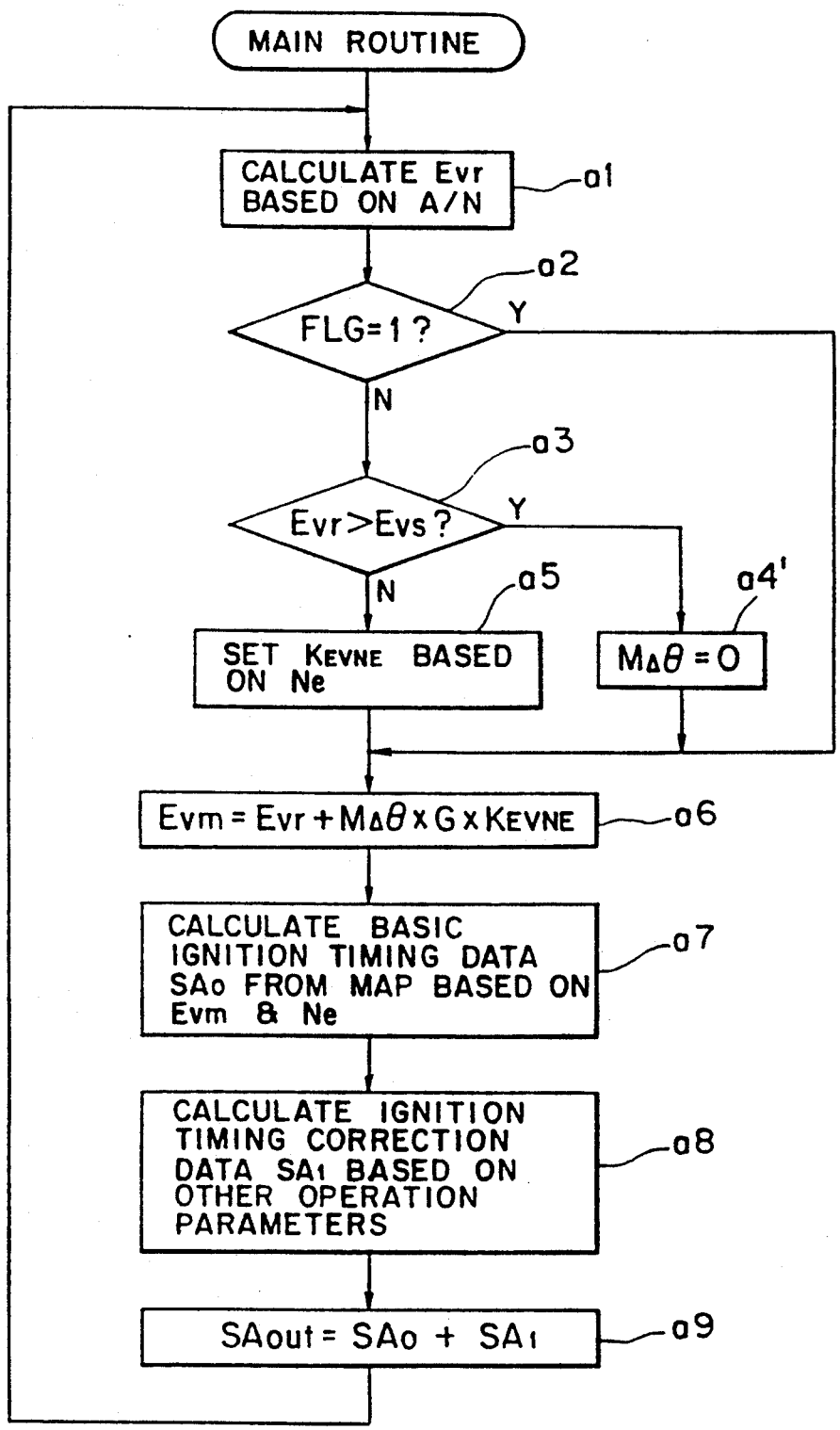
FIG. 4(d) is a flow chart of control according to a modification to setting control for a basic ignition timing of FIG. 4(a)

Meanwhile, FIG. 4(d) shows a modification to the main routine shown in FIG. 4(a), and the throttle opening variation sampling means 84 may be constructed such that, as shown in a control flow shown in FIG. 4(d), when a real volumetric efficiency Evr exceeds a threshold value Evs (in short, when sampling is inhibited), a stored value MΔθ of a throttle opening variation is cleared (step a4'). Also in this instance, as such control, that of the embodiment described hereinabove (refer to FIGS. 4(b) and 4(c)) can be applied.

It is to be noted that the sampling inhibition region of the real volumetric efficiency Evr is not limited to that of the embodiment described above, but can be set to a suitable region near the full open value.

Further, the holding period of a peak value is set in accordance with a number of cylinders of an engine and to a period for which each cylinder performs ignition once, but is not limited to that of the present embodiment described hereinabove.

INDUSTRIAL APPLICABILITY OF THE INVENTION

With the present engine ignition timing controlling system, an appropriate ignition timing can be set in various acceleration patterns, and knocking upon acceleration can be prevented while minimizing a bad influence upon quick acceleration of the engine so that smooth acceleration can be realized. Accordingly, the engine ignition timing controlling system is suitable for use for ignition timing control of an engine carried on an automobile.

We claim:

1. An ignition timing controlling system for an engine, characterized in that it comprises:
   throttle opening variation sampling means (84) for sampling a throttle opening (θ) of said engine and calculating a throttle opening variation (Δθ) based on a value obtained by such sampling:
   volumetric efficiency calculating means (82) for calculating an effective volumetric efficiency (Evm), said volumetric efficiency calculating means (82) including real volumetric efficiency calculating means (81) for calculating a real volumetric efficiency (Evr) based on a real intake air amount (A) and a real engine rotational speed (Ne), said volumetric efficiency calculating means (82) further including volumetric efficiency correcting means (83) for correcting the real volumetric efficiency (Evr) based on information regarding the throttle opening variation (Δθ):
   ignition timing setting means (58) for setting an ignition timing in accordance with the effective volumetric efficiency (Evm) and engine rotational speed (Ne):
   controlling means (68) for developing an ignition timing controlling signal based on the ignition timing set by said ignition timing setting means (58);
   ignition means (18) operable in response to reception of the ignition timing controlling signal; and
   sampling inhibiting means (85) for inhibiting, when the real volumetric efficiency (Evr) exceeds, upon acceleration of said engine, a predetermined threshold value corresponding to a value of the throttle opening in the proximity of the full open value, a sampling operation of said throttle opening variation sampling means (84).

2. An ignition timing controlling system for an engine as set forth in claim 1, characterized in that it is constructed such that said throttle opening variation sampling means (84) updates and stores the throttle opening variation (Δθ) for each predetermined period, and
   said volumetric efficiency correcting means (83) uses, as the information regarding the throttle opening variation (Δθ), a stored value (MΔθ) of the throttle opening variation (Δθ).

3. An ignition timing controlling system for an engine as set forth in claim 2, characterized in that it is constructed such that said throttle opening variation sampling means (84) holds, for a predetermined period of time, the stored value (MΔθ) stored at a point of time when sampling thereof is inhibited by said sampling inhibiting means (85).

4. An ignition timing controlling system for an engine as set forth in claim 3, characterized in that it is constructed such that said throttle opening variation sampling means (84) holds, when a period for which the stored value ($M\Delta\theta$) presents no change in state continues equal to or longer than a predetermined stored value holding period after an increasing tendency of the stored value ($M\Delta\theta$) has come to an end, the stored value ($M\Delta\theta$) for the predetermined stored value holding period, but holds the stored value ($M\Delta\theta$), when such period for which the stored value ($M\Delta\theta$) presents no change in state continues shorter than the predetermined stored value holding period, for the elapsed time then.

5. An ignition timing controlling system for an engine as set forth in claim 4, characterized in that the predetermined period of time for the holding of a stored value after a point of time when sampling is inhibited is set equal to the predetermined stored value holding period.

6. An ignition timing controlling system for an engine as set forth in claim 5, characterized in that it is constructed such that said throttle opening variation sampling means (84) clears the stored information thereof after lapse of the predetermined stored value holding period.

7. An ignition timing controlling system for an engine as set forth in claim 6, characterized in that the threshold value of said sampling inhibiting means (85) is set substantially equal to 95% of a volumetric efficiency corresponding to the full open value of the throttle opening.

8. An ignition timing controlling system for an engine as set forth in claim 2, characterized in that it is constructed such that said throttle opening variation sampling means (84) clears the stored value ($M\Delta\theta$) at a point of time when sampling is inhibited by said sampling inhibiting means (85).

9. An ignition timing controlling system for an engine as set forth in claim 8, characterized in that it is constructed such that said throttle opening variation sampling means (84) holds, when a period for which the stored value ($M\Delta\theta$) presents no change in state continues equal to or longer than a predetermined stored value holding period after an increasing tendency of the stored value ($M\Delta\theta$) has come to an end, the stored value for the predetermined stored value holding period, but holds the stored value ($M\Delta\theta$), when such period for which the stored value ($M\Delta\theta$) presents no change in state continues shorter than the predetermined stored value holding period, for the elapsed time then.

10. An ignition timing controlling system for an engine as set forth in claim 9, characterized in that it is constructed such that said throttle opening variation sampling means (84) clears the stored information thereof after lapse of the predetermined stored value holding period.

11. An ignition timing controlling system for an engine as set forth in claim 10, characterized in that the threshold value of said sampling inhibiting means (85) is set substantially equal to 95% of a volumetric efficiency corresponding to the full open value of the throttle opening.

12. An ignition timing controlling system for an engine as set forth in claim 2, characterized in that it is constructed such that the ignition timing is controlled in response to a temperature of cooling water for said engine.

13. An ignition timing controlling system for an engine as set forth in claim 12, characterized in that it is constructed such that the ignition timing is set such that, the higher the temperature of cooling water, the smaller the set lead angle value thereof.

14. An ignition timing controlling system for an engine as set forth in claim 2, characterized in that it is constructed such that the ignition timing is controlled in response to a temperature of intake air of said engine.

15. An ignition timing controlling system for an engine as set forth in claim 14, characterized in that the ignition timing is set such that it is retarded in regions wherein the temperature of intake air is high and low, but it is neither advanced nor retarded in any other region.

16. An ignition timing controlling system for an engine as set forth in claim 2, characterized in that it is constructed such that the ignition timing is controlled, during idling of said engine, based on information regarding a rotational speed of said engine.

17. An ignition timing controlling system for an engine as set forth in claim 16, characterized in that it is constructed such that the information regarding the rotational speed of said engine is the engine rotational speed itself, and when the engine rotational speed exceeds an aimed rotational speed which is set in response to idling information, the ignition timing is retarded, but when the engine rotational speed is lower than the aimed rotational speed, the ignition timing is advanced.

18. An ignition timing controlling system for an engine as set forth in claim 16, characterized in that it is constructed such that the information regarding the rotational speed of said engine is a variation of a rotational speed of said engine, and when the engine rotational speed is in an increasing tendency, the ignition timing is retarded, but when the engine rotational speed is in a decreasing tendency, the ignition timing is advanced.

* * * * *